(No Model.)
J. F. GEISLER.
FIREPROOFING AND PRESERVING WOOD, &c.
No. 560,614. Patented May 19, 1896.
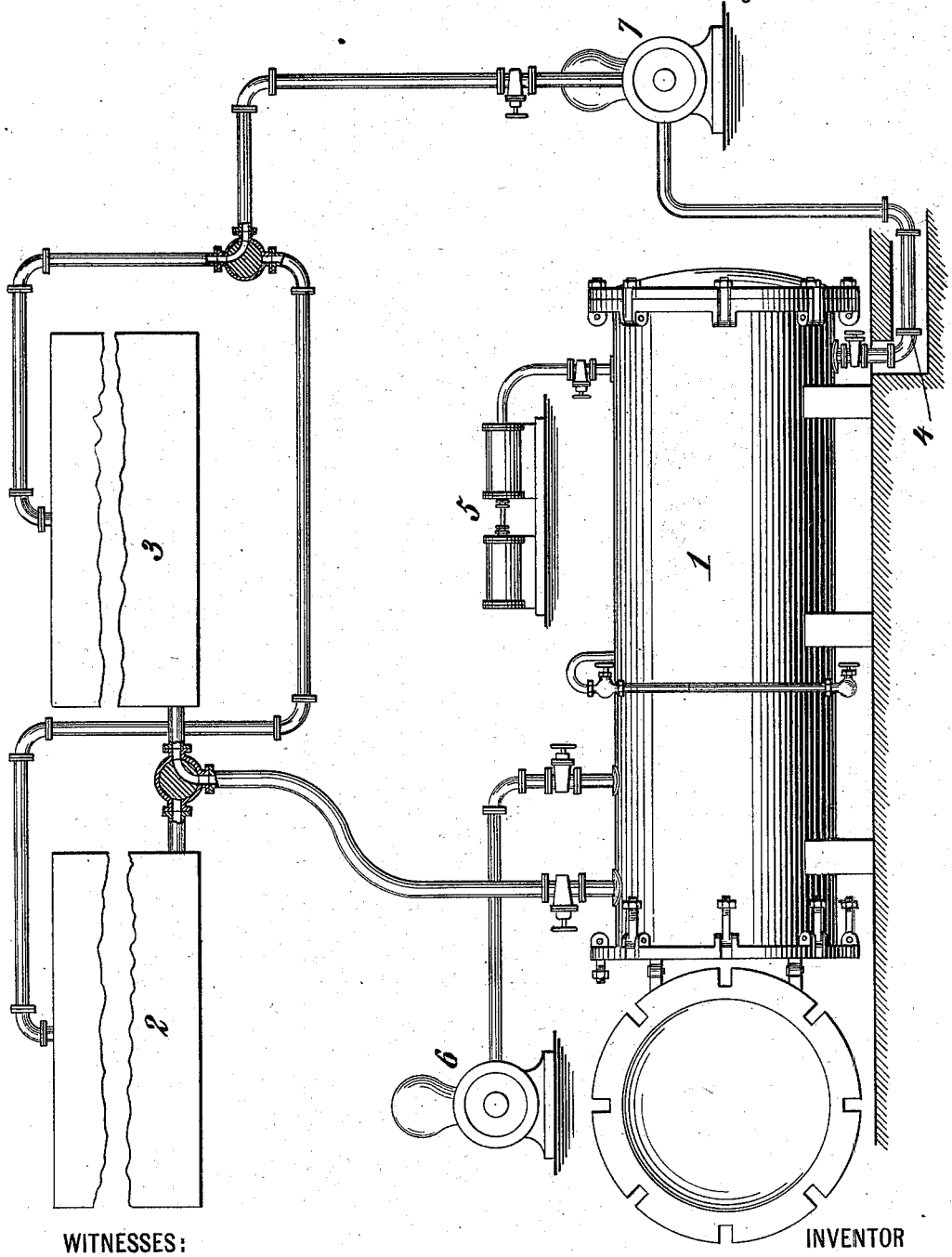
WITNESSES:
INVENTOR
Joseph F. Geisler
BY
ATTORNEYS

UNITED STATES PATENT OFFICE.

JOSEPH F. GEISLER, OF NEW YORK, N. Y., ASSIGNOR OF TWO-THIRDS TO A. EUGENE KIRBY AND CHARLES B. HARRIS, OF SAME PLACE.

FIREPROOFING AND PRESERVING WOOD, &c.

SPECIFICATION forming part of Letters Patent No. 560,614, dated May 19, 1896.

Application filed March 4, 1896. Serial No. 581,759. (No specimens.)

*To all whom it may concern:*

Be it known that I, JOSEPH F. GEISLER, a citizen of the United States, residing at New York, in the county of New York and State of New York, have invented certain new and useful Improvements in Processes of Fireproofing, Preserving, and Hardening Wood or other Fibrous Combustible Substances; and I do hereby declare the following to be a full, clear, and exact description of the invention, such as will enable others skilled in the art to which it appertains to make and use the same.

My invention relates to processes for fireproofing, preserving, and hardening wood or other fibrous combustible substances, such as paper, cloth, or the like.

My invention consists in the novel steps of the process used, in the novel substances and compositions used for rendering the wood or other substances treated fireproof, and in the novel means employed for sealing up the fireproof compounds within the pores and interstices of the fibers of the articles treated.

The objects of my invention are, first, to provide a process for fireproofing wood and other combustible fibrous substances which shall be more effective than the processes heretofore used, shall produce more durable results, and shall not in any way injure the material to which the fireproofing compounds are applied; second, to provide a process which shall be as inexpensive as possible; third, to provide means for sealing up the fireproofing compounds within the pores and interstices of the fibers of the articles treated, so that these substances shall not be washed out by the action of moisture, and, fourth, to provide a process for fireproofing wood and other similar substances which, while not injuring the substance in any way, shall preserve it and may be made to harden it, thus fitting it for many uses to which otherwise it is not applicable. These objects are attained in the process herein described, an apparatus by which the process may be carried out being illustrated in the accompanying drawing.

In carrying out my process the wood or other substance to be fireproofed is placed within a tank, such as the tank 1 illustrated in the drawing, capable of resisting considerable internal and external pressure, and the tank is closed. The tank is then filled and the wood therein treated successively with two solutions drawn from reservoirs 2 and 3, the tank being filled with each solution sufficiently so that the wood within the tank shall be completely submerged during the treatment. The first solution is drawn off from the tank 1 before the second solution is run into the tank, and each solution is allowed to remain within the tank 1 a sufficient length of time to permit the substances therein to become thoroughly impregnated with the solution, the time required for each treatment varying from one to six hours, according to the kind of wood treated, its grain, and its dryness.

In the solutions used I prefer to have about the following compositions and proportions:

A. Magnesium sulfate, five to twenty per cent.; gelatin or gelatinous matter, .5 to 1 per cent.; glycerin, .05 to .1 per cent.; water to make up to one hundred per cent.

B. Sodium tungstate, five to fifteen per cent.; ammonium borate, five to fifteen per cent.; ammonium tungstate, five to fifteen per cent.; ammonium phosphate, five to fifteen per cent.; sodium silicate, (to replace part or all of the sodium tungstate;) aqua-ammonia, about one per cent.; gelatin, albumen, or glycerin; water to make up to one hundred per cent.

Either of these solutions may be used first, the order in which they are applied not being material, though it is better to apply solution "A" first, as there is then less probability of unchanged magnesium sulfate being left in the wood after the treatment with the second solution. The two solutions combine within the pores of the wood or other substance treated and there precipitate the insoluble ammonium magnesium phosphate in conjunction with magnesium tungstate and borate, and magnesium silicate if sodium silicate has been used in one of the solutions. All of the glycerin, gelatin, or gelatinous matter, (such as glue,) albumen, or other sealing material may be applied in one solution and this may be either the first or second solution applied, or, if preferred, gelatin and the other sealing materials may be applied in both solutions.

After treatment with the second solution, resulting in the precipitation within the pores of the wood of the insoluble substances above mentioned, the solution is run off from the tank 1 through a drain-pipe 4. The sealing material introduced into the wood is then coagulated or hardened, so as to render it insoluble. If albumen has been used as a sealing material, it may be coagulated by heat, and for this purpose steam may be turned into the tank 1. If gelatin or gelatinous matter, such as glue, has been used as the sealing material, it may be hardened and rendered insoluble by treating the wood with formaldehyde-gas, preferably under pressure, which may be done either in the tank 1 or in a separate chamber. In general I prefer to use gelatin or glue and to harden it by the action of formaldehyde in the manner described, although it is frequently desirable to use both albumen and gelatin together as a sealing material.

If the gelatin has been introduced in the first solution, the formaldehyde may be introduced with the second solution, if desired, being dissolved therein.

The effect of coagulating the albumen and hardening the gelatin is to close the pores of the wood, thus protecting the salts precipitated in the wood against the action of moisture, which would tend to dissolve the soluble salts left in the wood.

The strength of the solutions used varies with the character of wood treated, close-grained and hard wood requiring more dilute solutions to be used in order that the solutions may penetrate the wood a sufficient depth. The strength of the second solution used must be sufficient to produce complete chemical change and no unchanged sulfate of magnesium should be left in the wood. If the wood is dry, the solutions used need not be as concentrated as when the wood is green.

Preferably after introducing the first solution into the tank 1 the air should be exhausted therefrom by means of a vacuum-pump 5, so that rapid impregnation of the wood may be effected. Except where the wood is of a character to absorb the solutions readily, the vacuum is broken after the solution has acted upon the wood for some time and a hydraulic pressure of from seventy-five to one hundred and fifty pounds per square inch is applied by a pressure-pump 6. With some woods, notably those with fine-grained fibers, it is necessary to dry the wood after treatment with the first solution and before treatment with the second solution.

The most important and most essential ingredient of the fireproofing compound deposited in the pores of the wood in the manner above described is the ammonium-magnesium phosphate, which I find more efficient than former substances used for the same purpose, while its cost is not great when obtained in the manner described. I find, however, that the cost of the treatment is somewhat reduced by using solutions which precipitate magnesium tungstate, borate, and silicate, as well as ammonium-magnesium phosphate, which are themselves effective fireproofing agents, and when not present in too great proportion do not detract injuriously from the superior efficiency of the ammonium-magnesium phosphate.

Each solution when drawn off from the tank 1 through the drain-pipe 4 may be returned to its reservoirs 2 or 3 by means of a pump 7 and suitable pipe connections.

The fireproofing compounds deposited in the wood, as above described, protect the wood from decay or injury by atmospheric causes. If the process be prolonged and a large proportion of gelatin used, also there results a hardening of soft-grained woods to such an extent as to make them capable of taking a very high polish, thus fitting the wood for many uses for which in its natural condition it is not fitted.

Fabrics and paper and other similar substances are treated in substantially the same manner as wood, but since these substances are more easily penetrated by the solutions than wood less time is required for the operation and it is not so necessary to conduct it under pressure in a closed tank. In many cases it is possible to mix the two solutions before applying them to the fabrics and to apply the mixed solutions with starch as a fixative or sealing agent.

Having thus completely described my invention, what I claim, and desire to secure by Letters Patent, is—

1. In the herein-described process of fireproofing, preserving and hardening combustible fibrous substances, the subprocess which consists in impregnating the substances treated with ammonium-magnesium phosphate, substantially as described.

2. The herein-described process of fireproofing, preserving, and hardening combustible fibrous substances, which consists in treating the substances to be fireproofed successively with a solution of a soluble salt of magnesium and with a solution containing ammonia and of ammonia salt of an acid making with magnesium an insoluble magnesium salt, thereby precipitating within the fibers an ammonium-magnesium salt of said acid, substantially as described.

3. The herein-described process of fireproofing, preserving, and hardening combustible fibrous substances, which consists in treating the substance to be fireproofed successively with a solution of magnesium sulfate, and with a solution containing ammonia and ammonium phosphate, substantially as described.

4. The herein-described process of fireproofing, preserving, and hardening combustible fibrous substances, which consists in treating the substance to be fireproofed, successively, with a solution of magnesium sulfate, and with a solution containing ammonia and a mixture of sodium tungstate and ammonium borate, tungstate, and phosphate, substantially as described.

5. The herein-described process of fireproofing, preserving, and hardening combustible fibrous substances, which consists in treating the substances to be fireproofed, successively, with a solution of magnesium sulfate, and with a solution containing ammonia and a mixture of sodium silicate, and ammonium borate, tungstate, and phosphate, substantially as described.

6. The herein-described process for fireproofing, preserving and hardening combustible fibrous substances, which consists in impregnating the substance treated with a fireproofing compound, such as above described, and with a solution containing a soluble sealing material, and then rendering the sealing material insoluble.

7. The herein-described process of fireproofing, preserving, and hardening combustible fibrous substances, which consists in impregnating the substance treated with a fireproofing compound and with a gelatinous sealing material, and then hardening this gelatinous material by the action of formaldehyde, substantially as described.

In testimony whereof I affix my signature in presence of two witnesses.

JOSEPH F. GEISLER.

Witnesses:
HARRY M. MARBLE,
CAROLINE E. DAVIDSON.